United States Patent
Jiang et al.

(10) Patent No.: US 6,502,072 B2
(45) Date of Patent: *Dec. 31, 2002

(54) TWO-TIER NOISE REJECTION IN SPEECH RECOGNITION

(75) Inventors: Li Jiang, Redmond, WA (US); Xuedong Huang, Woodinville, WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/417,172

(22) Filed: Oct. 12, 1999

(65) Prior Publication Data

US 2002/0082829 A1 Jun. 27, 2002

Related U.S. Application Data

(60) Provisional application No. 60/109,157, filed on Nov. 20, 1998.

(51) Int. Cl.$^7$ ............................................. G10L 15/14
(52) U.S. Cl. ........................ 704/255; 704/256; 704/254
(58) Field of Search ................................ 704/254, 255, 704/256

(56) References Cited

U.S. PATENT DOCUMENTS 5,797,123 A * 8/1998 Chou et al. ................. 704/256

2001/0018654 A1 * 8/2001 Hon et al. ................. 704/257

OTHER PUBLICATIONS

Richard C. Rose and Douglas B. Paul, "A Hidden Markov Model Based Keyword Recognition System," Proc. IEEE ICASSP 90, vol. 1, p. 129–132, Apr. 1990.*

Jay G. Wilpon, Lawrence R. Rabiner, Chin–Hui Lee, and E. R. Goldman, "Automatic Recognition of Keywords in Unconstrained Speech Using Hidden Markov Models," IEEE Trans. ASSP, vol. 38, No. 11, p. 1870–1878, Nov. 1990.*

Richard C. Rose and E. Lleida, "Speech Recognition Using Automatically Derived Baseforms," Proc. IEEE ICASSP 97, Vojl. 2, p. 1271–1274, Apr. 1997.*

Rafid A. Sukkar and Jay G. Wilpon, "A Two Pass Classifier for Utterance Rejection in Keyword Spotting," Proc. IEEE ICASSP 93, vol. 2, p. 451–545, Apr. 1993.*

* cited by examiner

*Primary Examiner*—Tālivaldis Ivars Šmits
(74) *Attorney, Agent, or Firm*—Theodore M. Magee; Westman, Champlin & Kelly, P.A.

(57) ABSTRACT

A method and apparatus is provided for two-tier noise rejection in speech recognition. The method and apparatus convert an analog speech signal into a digital signal and extract features from the digital signal. A hypothesis speech word and a hypothesis noise word are identified from respective extracted features. The features associated with the hypothesis speech word are examined in a second tier of noise rejection to determine if the features are more likely to represent noise than speech. The hypothesis speech word is replaced by a noise marker if the features are more likely to represent noise than speech.

20 Claims, 3 Drawing Sheets

TWO-TIER NOISE REJECTION IN SPEECH RECOGNITION

REFERENCE TO RELATED APPLICATIONS

The present invention claims priority from a U.S. Provisional application having Ser. No. 60/109,157, filed on Nov. 20, 1998, and entitled "CONFIDENCE MEASURE IN SPEECH RECOGNITION USING TRANSFORMATION ON SUB-WORD FEATURES."

BACKGROUND OF THE INVENTION

The present invention relates to speech recognition. In particular, the present invention relates to noise rejection in speech recognition.

In speech recognition systems, an input speech signal is converted into words that represent the verbal content of the speech signal. This conversion is complicated by many factors including interfering sounds, which are generically referred to as noise. Noise includes such things as the sounds made when the speaker clears their throat or smacks their lips. It also includes external sounds such as the sound of footsteps, the sound of someone knocking at a door, and the sound of a phone ringing.

Since most speech recognition systems work by matching sounds to the basic acoustic units of speech, for example senones or phonemes, many speech recognition systems will identify noise as one or more words. For instance, if a user types on a keyboard during speech recognition, the sound of the typing may be interpreted as the word "its".

To avoid such false acceptance, some speech recognition systems add models of noise to the acoustic models used for speech recognition. These models rely on a noise entry found in a lexicon for the speech recognizer. For example, a model would be created for the sound associated with knocking on a door. Because the model relies on an entry in the lexicon, noises that are not in the lexicon cannot be identified as noise by these models and are usually identified as a word. Since there is a wide variety of noises, it is impossible to include all noises in the lexicon. As such, there are a large number of noises that are improperly recognized as words in prior art speech recognition systems.

SUMMARY OF THE INVENTION

A method and apparatus is provided for two-tier noise rejection in speech recognition. The method and apparatus convert an analog speech signal into a digital signal and extract features from the digital signal. Hypothesis speech words and hypothesis noise words are identified from extracted features in a first tier of noise rejection by modeling common noises as words in a lexicon. The features associated with the hypothesis speech words are examined in a second tier of noise rejection to determine if the features are more likely to represent noise than speech. The hypothesis speech words are replaced by a noise marker if the features are more likely to represent noise than speech.

DETAILED DESCRIPTION OF ILLUSTRATIVE EMBODIMENTS

Figure 1:
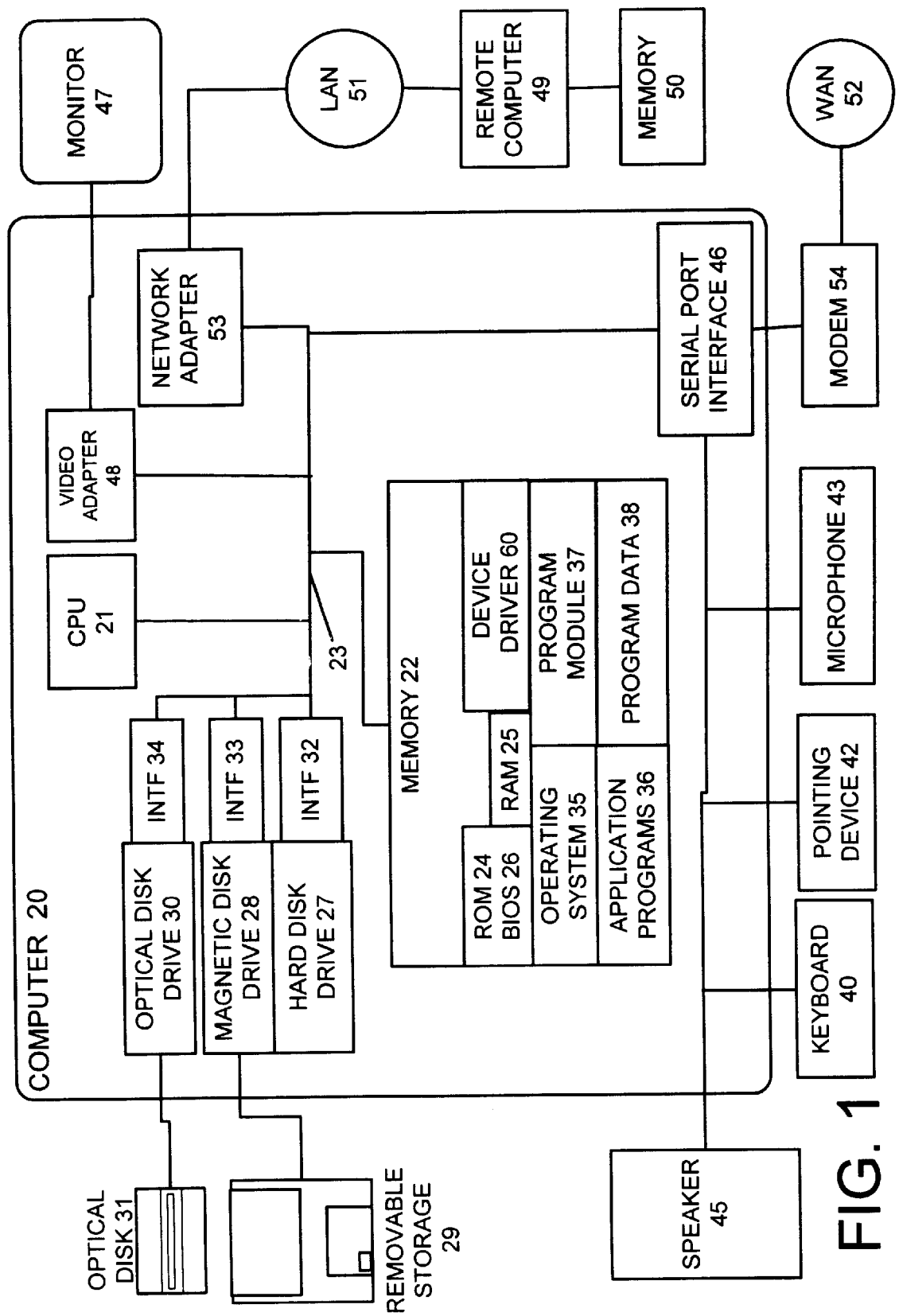
FIG. 1 is a plan view of a general computing environment in which one embodiment of the present invention is used.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Although FIG. 1 shows an exemplary environment, the present invention is not limited to a digital-computing environment. In particular, the present invention can be operated on analog devices or mixed signal (analog and digital) devices. Furthermore, the present invention can be implemented on a single integrated circuit, for example, in small vocabulary implementations.

Figure 2:
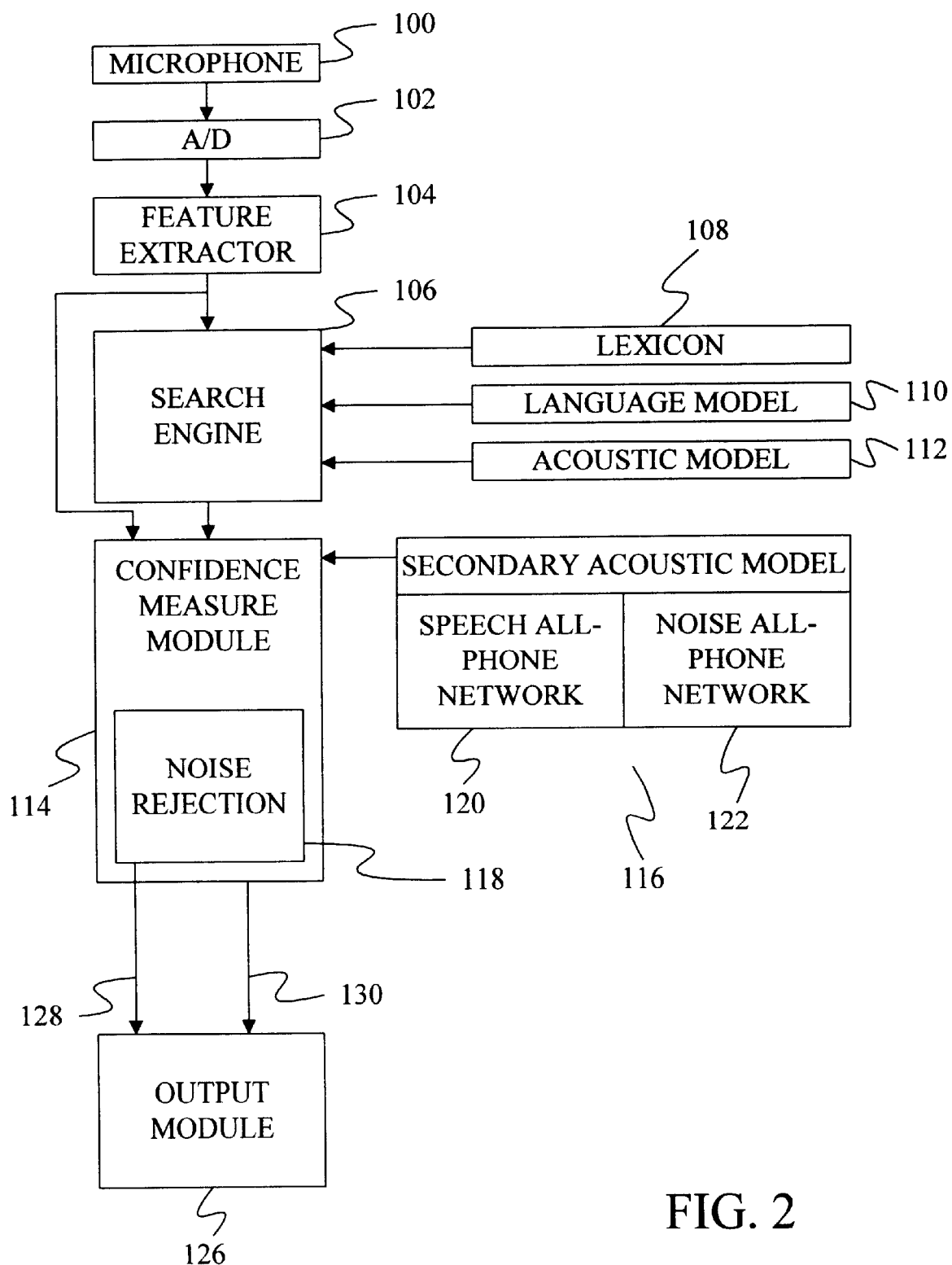
FIG. 2 is a block diagram of a speech recognition system of an embodiment of the present invention.

FIG. 2 provides a more detailed block diagram of modules of the general environment of FIG. 1 that are particularly relevant to the present invention. In FIG. 2, an input signal is converted into an electrical signal by a microphone 100, which is connected to an analog-to-digital (A-to-D) converter 102. A-to-D converter 102 converts the analog signal into a series of digital values. In several embodiments, A-to-D converter 102 samples the analog signal at 16 kHz thereby creating 16 kilobytes of speech data per second.

The digital data created by A-to-D converter 102 is provided to a feature extractor 104 that extracts one or more features from the digital speech signal. Such feature extraction is used to remove redundant data from the speech signal, to reduce the total amount of data provided to the speech recognizer and to isolate data that is particularly relevant to speech models used by the speech recognizer.

In one embodiment, feature extractor 104 divides the digital signal into 25 millisecond frames with 10 millisecond overlap between consecutive frames. For each frame, feature extractor 104 calculates Mel-scale Cepstrum coefficients. This information is then taken as a feature vector, which may be further encoded using vector quantization and a codebook derived from training data.

The feature vectors (or codewords) are provided to a search engine 106, which identifies a most likely word sequence based on the feature vectors, an acoustic model 108, a language model 110, and a lexicon 112.

Acoustic model 108 provides a set of acoustic scores, for example log likelihoods, that describe the likelihood that a series of feature vectors was created by a particular series of sub-words, such as a series of senones, phonemes, noise phones, diphones, or triphones. In most cases the sub-word units are modeled as being context-dependent. Such context-dependence is inherent in triphone sub-word units, which treat the same phoneme in different left and right contexts as different units. Examples of acoustic model 108 include discrete, semi-continuous or continuous density Hidden Markov Models (HMM) that provide log-likelihoods for any sequence of sub-words that can be generated by the lexicon for a series of feature vectors. In one embodiment, a set of HMMs with continuos-density output probabilities is used that consists of 3000 senones. A mixture of four Gaussian densities with diagonal covariances is used for each senone.

Language model 110 provides a set of likelihoods that a particular sequence of words will appear in the language of interest. In many embodiments, the language model is based on a speaker-independent database such as the North American Business News (NAB), which is described in greater detail in a publication entitled CSR-III Text Language Model, University of Penn., 1994. The language model may be a context-free grammar or a statistical N-gram model such as a trigram. In one embodiment, the language model is a compact trigram model that determines the probability of a sequence of words based on the combined probabilities of three-word segments of the sequence.

Based on the acoustic model, the language model, and the lexicon, search engine 106 generates an acoustic score and a language score for a set of words. Search engine 106 then selects the most probable sequence of words and/or noises, which it provides at its output along with the acoustic scores and language scores associated with those words and/or noises. Since this process is able to identify one or more noises in the input signal, it is considered a first level or tier of noise rejection.

In one embodiment, search engine 106 uses a pronunciation prefix tree to form a single pass decoder. The sharing in the tree can eliminate redundant computations for different words with the same prefix in pronunciation. In this embodiment, look ahead is also used for efficient pruning of the search space.

The most probable sequence of hypothesis words and/or noises and the acoustic and language scores associated with those words and noises are provided to confidence measure module 114, which also receives the feature vectors produced by feature extractor 104.

In confidence measure modules of the prior art, a confidence measure is determined for each word identified by the search engine by using a secondary acoustic model such as secondary acoustic model 116. Examples of such a secondary acoustic model include "filler" models.

A filler model consists of a fully connected sub-word network such as a fully connected phone network. A filler sub-word model differs from the acoustic models used by the search engine in that the filler model is not limited to terms and noises found in a lexicon. Under a filler model, any grouping of sub-words is possible, even if the grouping does not form a word or noise from the lexicon. Filler models may be context-dependent or context-independent and may be searched using a Viterbi beam search.

In determining the confidence measure for each hypothesis word produced by the search engine, prior art confidence measure modules divide the word's speech score from the search engine by the word's secondary acoustic score from the secondary acoustic model. A hypothesis word with a search engine score that is low relative to the secondary acoustic model score is generally identified as being improperly recognized. This will most often occur for out-of-vocabulary terms, which are terms that do not appear in the lexicon used by the search engine but appear with a substantial probability in the all-phone network. This follows from the fact that the speech score for an out-of-vocabulary word will generally be low because no word in the lexicon matches the actual spoken item, while the filler model will always find a match because it is not constrained by a lexicon.

In the confidence measure systems described above, noise in the input signal that is not recognized as noise by the search engine may generate a low confidence measure score, indicating that the search engine improperly recognized the noise as a word. However, the confidence measure of the prior art does not indicate if the input signal is noise or an out-of-vocabulary word. It simply indicates that the hypothesis word identified by the search engine is probably incorrect. In addition, because confidence measure systems do not always work, they may generate a high confidence score that will cause the noise segment to be misidentified as speech.

The hypothesis terms 128 identified by the search engine and their confidence measures 130 are provided to an output module 126, which can include a display driver for displaying the recognized words or a command driver for interpreting the recognized words as one or more commands. For example, the speech recognition system can be connected to an appliance and output module 126 can be connected to a controller for the appliance, such that words provided by output module 126 are interpreted as commands for the appliance.

The performance of output module 126 is directly related to the number of noises that are presented to it as words. For each noise that is improperly recognized as a word, output module 126 must interact with the user to clarify what the user meant by the noise. Thus, in a dictation system, output module 126 must highlight the erroneous words so that the user can remove them from the text. In a command system, output module 126 must ask the user to verify the command.

The present inventors recognize that the performance of output module 126, and thus the entire recognition system, can be enhanced by detecting and rejecting noise in confidence measure module 114. Thus, instead of simply determining that a word recognized by search engine 106 is incorrect, the present invention detects whether the recognized word is actually noise.

In FIG. 2, this noise rejection is performed by a noise rejection module 118 before the hypothesis terms are provided to output module 126. Noise rejection module 118 divides the all-phone network of secondary acoustic model 116 into a speech all-phone network 120 and a noise all-phone network 122. Speech all-phone network 120 includes only the sub-words associated with speech. Noise all-phone network 122 includes a collection of fully connected sub-units of noise and silence. Noise all-phone network 122 may be trained using a variety of input noises and it may be modeled as a context-dependent or context-independent network.

To determine if a hypothesis word is actually noise, noise rejection module 118 determines two separate secondary scores. One score represents the likelihood that the feature vectors were created by a series of phones in speech all-phone network 120. The other score represents the likelihood that the feature vectors were created by a series of phones in the noise all-phone network 122.

In one embodiment, noise rejection module 118 uses a Viterbi beam search to identify a most likely series of phones in each network and a log-likelihood for each of those series. The log-likelihoods are then combined by taking the ratio of the log likelihood associated with the speech all-phone network over the log likelihood associated with the noise all-phone network. If this ratio is high, the feature vectors have a higher probability of matching a series of speech phones than of matching a series of noise phones. As such, the feature vectors probably represent an actual word. If the ratio is low, the feature vectors are more likely to represent a sequence of noise phones than a sequence of speech phones. In that case, the feature vectors probably represent noise.

In one embodiment, noise rejection module 118 replaces words recognized by search engine 106 with noise entries if the ratio of the speech phone network to the noise phone network is below a set threshold. In one embodiment, that threshold is trained using a combination of speech and noise input signals.

Note that the noise rejection provided by module 118 is a second tier of noise rejection above a first tier provided by the lexicon of noise used by search engine 106. Thus, if a noise matches a noise entry in the lexicon used by search engine 106 it will be identified as noise. However, if a noise does not fit that lexicon, it will be improperly recognized as a word by search engine 106 and passed to noise rejection module 118. Noise rejection module 118 then examines the feature vectors associated with the word to determine if the feature vectors actually represent a word or whether they represent a noise that is not in the lexicon. Thus, noise that is not detected by search engine 106 can be detected by noise rejection module 118.

Figure 3:
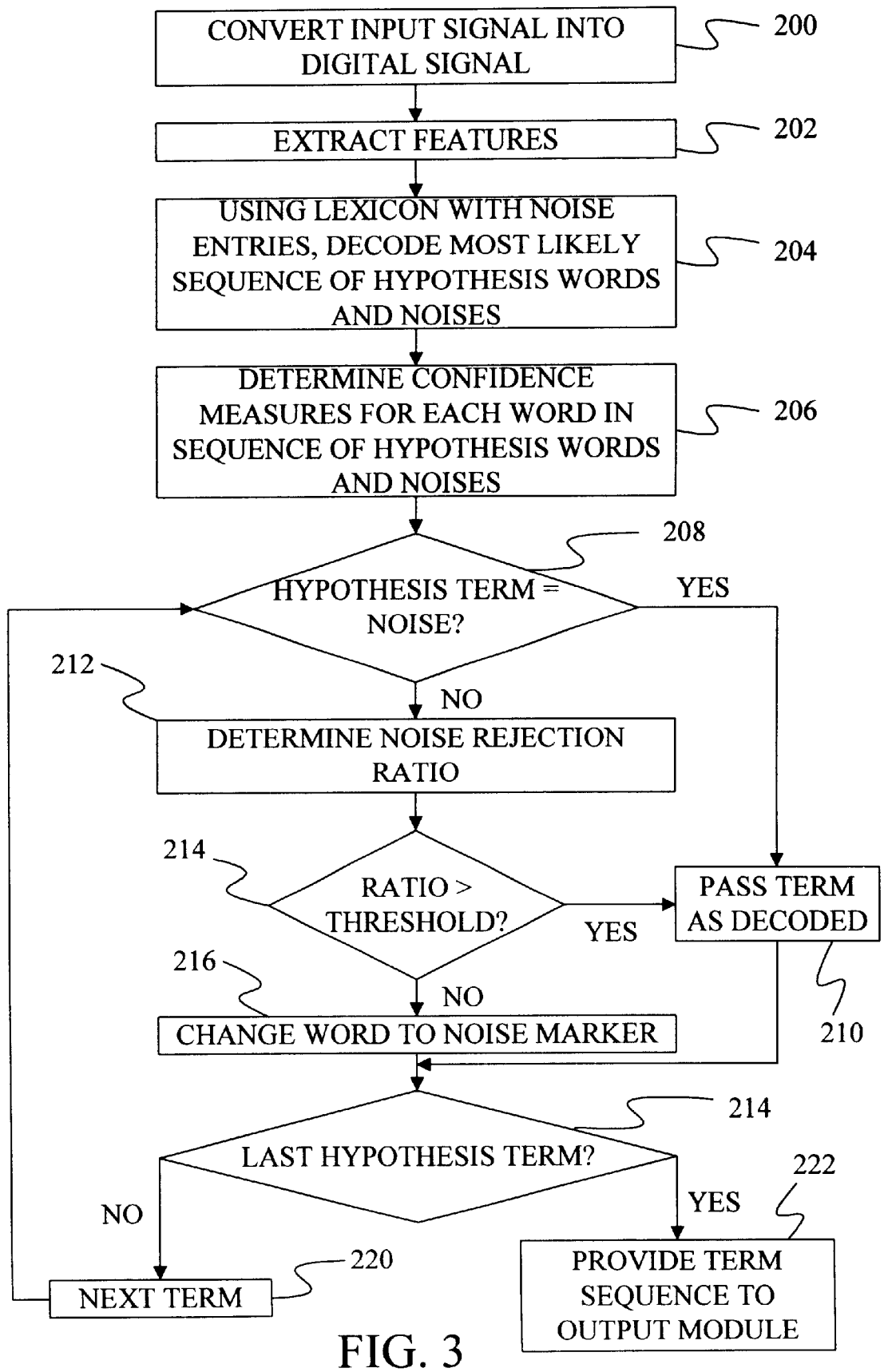
FIG. 3 is a flow diagram of a two-tier noise rejection method of one embodiment of the present invention.

The flow diagram of FIG. 3 provides a summary of the two-tier noise rejection method of the present invention. In step 200, an input signal is converted into a digital signal. Features are then extracted from the digital signal at step 202. The extracted features are decoded at step 204 using a lexicon and an acoustic model that include noise entries. The result of this decoding is a most likely sequence of words and noise. Since noise is identified in step 204, it is considered the first tier in the two-tier noise rejection of the present invention.

A confidence measure is determined for each word in the sequence of hypothesis words and noises at step 206. The first hypothesis term is then examined at step 208. If the hypothesis term is identified as a noise entry at step 204, it is passed as such at step 210. If the hypothesis term is identified as a word, the process continues at step 212 were the ratio of the speech all-phone network likelihood over the noise all-phone network likelihood is determined. If this rejection ratio is greater than a threshold at step 214, the decoded word is probably a word and is passed at step 210. If the rejection ratio is less than the threshold at step 214, the word is replaced by a generic noise marker at step 216. Because steps 212, 214 and 216 can identify noise in the decoded sequence of hypothesis words and noises, these steps represent the second tier of the two-tier noise rejection of the present invention.

After steps 216 and 210, the process determines if there are more hypothesis terms in the sequence of hypothesis words and noises at step 218. If there are more terms, the next decoded term is selected at step 220, and the process returns to step 208. If there are no more decoded terms at step 218, the revised sequence of words and/or noises is provided to the output module at step 222.

Although the present invention has been described with reference to particular embodiments, workers skilled in the art will recognize that changes may be made in form and detail without departing from the spirit and scope of the invention.

What is claimed is:

1. A speech recognition system for identifying words from a digital input signal, the system comprising:
   a feature extractor for extracting at least one feature from the digital input signal;
   a lexicon comprising at least one noise entry;
   a search engine capable of identifying a sequence of hypothesis terms based on at least one feature and at least one speech model, at least one of the hypothesis terms being a noise entry found in the lexicon and at least one of the hypothesis terms being a hypothesis word; and
   a noise rejection module capable of replacing a hypothesis word in the sequence of hypothesis terms with a noise marker by identifying noise based in part on a model of noise phones and at least one feature.

2. The speech recognition system of claim 1 wherein the noise rejection module identifies noise that is not in the lexicon.

3. The speech recognition system of claim 1 wherein the noise rejection module identifies noise through a process comprising:
   determining a noise probability for a sequence of noise phones based on the model of noise phones and the at least one feature;
   determining a speech probability for a sequence of speech phones based on a model of speech phones and the at least one feature;
   dividing the speech probability by the noise probability to produce a speech-noise ratio; and
   comparing the speech-noise ratio to a threshold to decide whether to replace a hypothesis word with a noise marker.

4. The speech recognition system of claim 3 wherein the noise probability is the probability associated with the most likely sequence of noise phones based on the model of noise phones and the at least one feature.

5. The speech recognition system of claim 4 wherein the speech probability is the probability accociated with the most likely sequence of speech phones based on the model of speech phones and the at least one feature.

6. The speech recognition system of claim 5 wherein the model of noise phones is a fully connected noise phone network.

7. The speech recognition system of claim 6 wherein the model of speech phones is a fully connected speech phone network.

8. A method of speech recognition comprising:
   extracting features from a set of digital values representing speech;
   identifying a hypothesis word and a hypothesis noise entry based on the features and a lexicon containing the word and the noise entry;
   performing second tier noise identification by determining whether the features associated with the hypothesis word are more likely to represent noise than the hypothesis word based on a noise phone model and the features associated with the hypothesis word; and
   replacing the hypothesis word with a noise marker if the features associated with the hypothesis word are more likely to represent noise.

9. The method of claim 8 wherein performing second tier noise identification comprises determining a noise probability associated with a sequence of phones in the noise phone model.

10. The method of claim 9 wherein performing second tier noise identification further comprises determining a speech probability associated with a sequence of phones in a speech phone model.

11. The method of claim 10 wherein performing second tier noise identification further comprises determining a ratio between the noise probability and the speech probability.

12. The method of claim 11 wherein determining a ratio between the noise probability and the speech probability comprises dividing the speech probability by the noise probability.

13. The method of claim 11 wherein the noise probability is a probability value associated with the most likely sequence of noise phones given the features.

14. The method of claim 13 wherein the speech probability is a probability value associated with the most likely sequence of speech phones given the features.

15. A computer-readable medium having computer-executable instructions for performing steps comprising:
   receiving a digital signal representative of an input speech and noise signal;
   extracting features from the digital signal;
   identifying at least one hypothesis noise term and at least one hypothesis word term from the features;
   examining the features associated with at least one hypothesis word term to determine if the features are more likely to represent noise than a word; and
   replacing a hypothesis word term with a noise marker if the features associated with the hypothesis word term are more likely to represent noise than a word.

16. The computer-readable medium of claim 15 wherein the step of identifying at least one hypothesis noise term comprises identifying a noise term from a lexicon of terms.

17. The computer-readable medium of claim 15 wherein the step of examining the features associated with at least one hypothesis word term comprises determining a noise probability of a sequence of noise phones using a noise phone model.

18. The computer-readable medium of claim 17 wherein the step of examining the features associated with at least one hypothesis word term further comprises determining a speech probability of a sequence of speech phones using a speech phone model.

19. The computer-readable medium of claim 18 wherein the step of examining the features associated with at least one hypothesis word term further comprises determining a ratio between the speech probability and the noise probability.

20. The computer-readable medium of claim 19 wherein determining a ratio between the speech probability and the noise probability comprises dividing the speech probability by the noise probability.

* * * * *